United States Patent
Heron et al.

(10) Patent No.: US 7,664,816 B2
(45) Date of Patent: *Feb. 16, 2010

(54) MULTI-PARTICIPANT ONLINE ACTIVITIES

(75) Inventors: Alexandra K Heron, Kirkland, WA (US); David Michael Miller, Redmond, WA (US); John S Holmes, Redmond, WA (US); Eric L Matteson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

This patent is subject to a terminal disclaimer.

(21) Appl. No.: 11/150,475

(22) Filed: Jun. 10, 2005

(65) Prior Publication Data

US 2007/0005704 A1    Jan. 4, 2007

(51) Int. Cl.
*G06F 15/16* (2006.01)
(52) U.S. Cl. ................................ 709/204
(58) Field of Classification Search ............. 709/206, 709/207, 204, 227, 224, 203, 219, 205; 707/1, 707/102, 10, 3; 705/53, 26, 1, 14, 57, 80, 705/37; 463/42, 16, 273; 348/E5.006, E5.008, 348/E7.06, E7.07, E7.009, E7.024
See application file for complete search history.

(56) References Cited

U.S. PATENT DOCUMENTS

| | | | |
|---|---|---|---|
| 6,466,969 B1* | 10/2002 | Bunney et al. | 709/206 |
| 6,947,761 B2* | 9/2005 | Hutcheson et al. | 455/518 |
| 2003/0126094 A1* | 7/2003 | Fisher et al. | 705/75 |
| 2003/0177187 A1* | 9/2003 | Levine et al. | 709/205 |
| 2003/0233650 A1* | 12/2003 | Zaner et al. | 725/32 |
| 2004/0034687 A1* | 2/2004 | Friedman | 709/205 |
| 2004/0068567 A1* | 4/2004 | Moran et al. | 709/227 |
| 2004/0177111 A1* | 9/2004 | Vincent et al. | 709/203 |
| 2005/0027382 A1* | 2/2005 | Kirmse et al. | 700/91 |
| 2005/0149443 A1* | 7/2005 | Torvinen | 705/51 |
| 2005/0164793 A1* | 7/2005 | Merimovich et al. | 463/42 |
| 2005/0209002 A1* | 9/2005 | Blythe et al. | 463/42 |
| 2006/0171380 A1* | 8/2006 | Chia | 370/352 |
| 2006/0178216 A1* | 8/2006 | Shea et al. | 463/42 |
| 2007/0220091 A1* | 9/2007 | Wang et al. | 709/204 |

* cited by examiner

*Primary Examiner*—Benjamin R Bruckart
(74) *Attorney, Agent, or Firm*—Lee & Hayes, PLLC

(57) ABSTRACT

Multi-participant online activities are described. In one or more implementations, a protocol is described which ties an online activity (e.g., an online game) to an instant messaging infrastructure. For example, an online game may leverage the instant messaging infrastructure to form rosters of participants for participation in the online game, Once the roster is formed, the instant messaging infrastructure may further manage the presence of the participants in the online activity, such as which users join and cease participation in the online activity and notify other users of these changes. Further, the state of participation in the online activity may be stored such that the users may continue between sessions.

20 Claims, 13 Drawing Sheets

MULTI-PARTICIPANT ONLINE ACTIVITIES

BACKGROUND

A user has access to a variety of online activities that are accessible over a network. For example, the user may play an online game, in which, the user interacts with a number of other users over a network. For instance, a plurality of users may each access an online poker game to play cards against each other, participate in an online sports game in which each of a plurality of users are members of the same team, and so on. Because the online activity is accessible via a network, the users may access the online activity from a wide variety of geographical locations, such as within a city, across a country, and even around the world.

Typical online activities that involve instant messaging, however, utilize static rosters such that participation in the activity is limited to those who were initially a part of the group that initiated the activity. Therefore, each participant was required to manually join the online activity before participation in the online activity was permitted for each of the users. Additionally, current online activities are typically performed by a single user or a group that is created on an ad hoc basis. Therefore, to participate in the online activity, each user is required to perform multiple steps, a result of which may be that no other users are even available to participate in the online activity. This may result in user frustration, even to the point that the users choose to forgo participation in the online activity. Thus, the online activity may be underutilized, which also results in lost business opportunities to a provider of the online activity.

SUMMARY

Multi-participant online activities are described. In one or more implementations, a protocol is described which ties an online activity (e.g., an online game) to an instant messaging infrastructure. For example, an online game may leverage the instant messaging infrastructure to form rosters of participants for participation in the online game. Once the roster is formed, the instant messaging infrastructure may further manage the presence of the participants in the online activity, such as which users join and cease participation in the online activity and notify other users of these changes. Further, the state of participation in the online activity may be stored such that the users may continue interaction with the online activity between sessions.

BRIEF DESCRIPTION OF THE DRAWINGS

The same reference numbers are utilized in instances in the discussion to reference like structures and components.

DETAILED DESCRIPTION

Overview

Traditional online activities that involve instant messaging, such as online games, are typically limited to static rosters. For example, traditional multi-participant game models that are utilized in conjunction with instant messaging require a first user to send an invitation to play a game to another user and await a response. However, the game, when launched, may be static in terms of not adapting to users when "coming online" or "going offline". This may lead to user frustration and even discourage users from participating in the game.

Techniques are described, in which, a protocol for a messaging system (e.g., an instant messaging system) is utilized such that an online activity may leverage the messaging system. For example, a user may launch a multi-player game and then, during the launch process, specify groups of people that should receive a message. Those recipients are then joined in a conversation with the initiating user and are also given an opportunity to participate in the game. As new users come online of go offline, the game may automatically reflect the changes in "presence" of the users. For example, as a user comes online, that user may see a roster of people conversing using instant messages and a roster of people playing the game. The user may then choose to join the online activities, such as to participate in the instant messaging session and/or play the game. Additionally, the protocol enables users of different software and/or hardware to participate in the activity by leveraging the messaging infrastructure. Further, when users stop playing the game, the state of the game may be saved such that when the members of the game come online again, the previous state may be retrieved and offered to the users to continue where they left off.

In the following discussion, an exemplary environment is first described which is operable to employ the multi-participant techniques for online activities. Exemplary procedures and user interfaces are then described which may be employed in the exemplary environment, as well as in other environments.

Exemplary Environment

Figure 1:
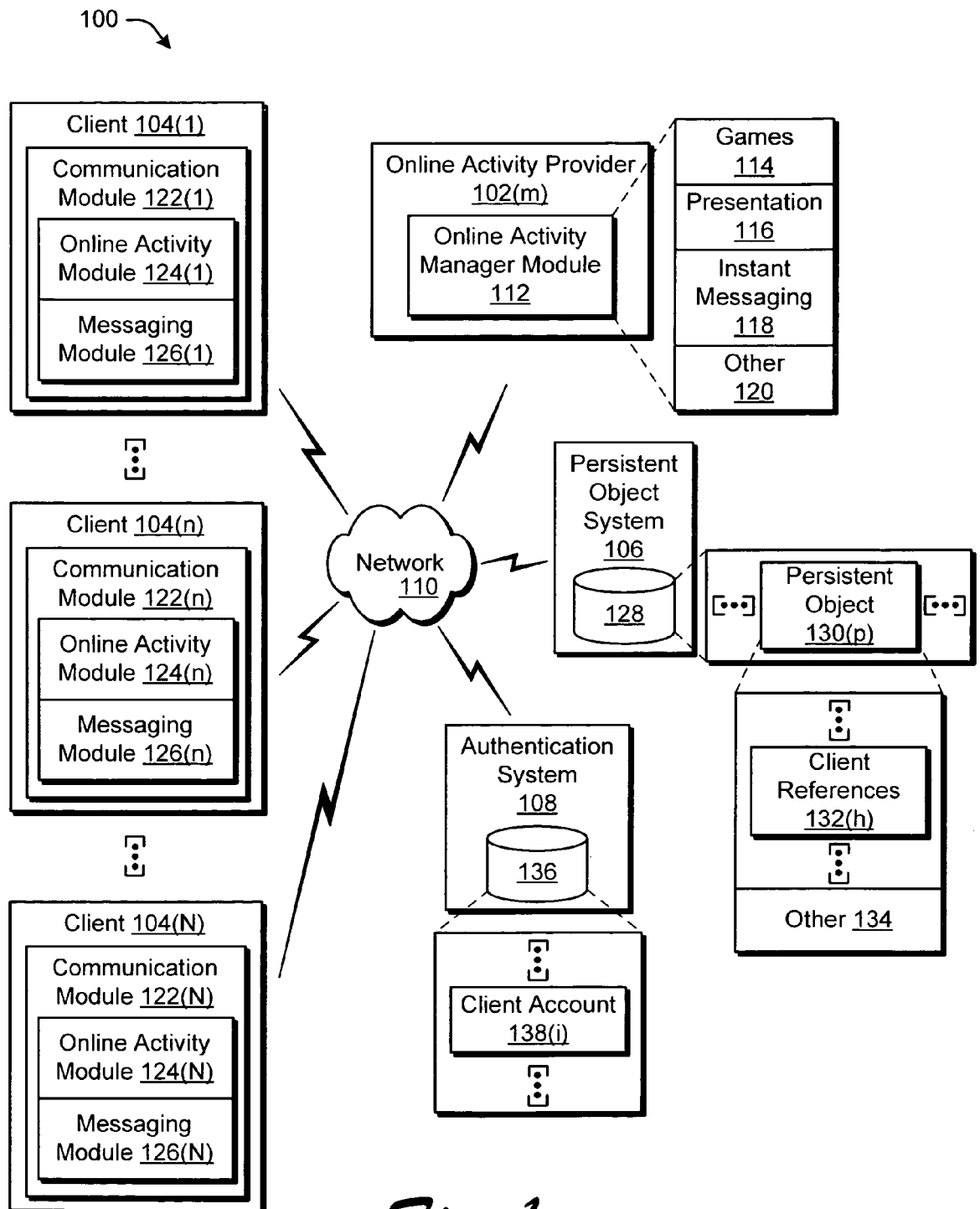
FIG. 1 is an illustration of an environment in an exemplary implementation that is operable to employ multi-participant techniques for online activities.

FIG. 1 is an illustration of an environment 100 in an exemplary implementation that is operable to employ multi-participant techniques for online activities. The illustrated environment 100 includes a plurality of online activity providers 102(m) (where "m" can be any integer from one to "M") a plurality of clients 104(1), . . . , 104(n), . . . , 104(N), a persistent object system 106, and an authentication system 108, each of which are communicatively coupled, one to another, over a network 110. The clients 104(1)-04(N) may be configured in a variety of ways. For example, one or more of the clients 104(1)-104(N) may be configured as a computing device that is capable of communicating over the network 110, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, clients 104(1)-104(N) may describe logical clients that include users, software and/or devices.

Although the network 110 is illustrated as the Internet, the network may assume a wide variety of configurations. For example, the network 110 may include a wide area network (WAN), a local area network (LAN), a wireless network, a peer-to-peer network, a public telephone network, an intranet, and so on. Further, although a single network 110 is shown, the network 110 may be configured to include multiple networks. For instance, the online activity provider 102 (m) and the persistent object system 106 may be communicatively coupled via a corporate Intranet to communicate, one to another. Additionally, both the online activity provider 102(m) and the persistent object system 106 may be communicatively coupled to the clients 104(1)-104(N) over the Internet. A wide variety of other instances are also contemplated.

The online activity provider 102(m) is illustrated as including an online activity manager module which is executable to manage online activities of the plurality of clients 104(1)-104 (N) over the network 110. The online activities managed by the online activity manager module 112 may be configured in a wide variety of ways. For example, the online activities may be configured as a game 114 (e.g., online poker, interactive role playing games, bridge, chess, and so on), a presentation 116 (e.g., a slideshow presentation shown to the plurality of clients 104(1)-104(N), and so on), instant messaging 118, and other 120 online activities, such as online meetings.

Each of the plurality of clients 104(1)-104(N) is illustrated as including a respective one of a plurality of communication modules 122(1)-122(N). Each of the communication modules 122(1)-122(N) is executable to participate in the online activity over the network 110. For example, each of the communication modules 122(1)-122(N) is illustrated as including a respective one of a plurality of online activity modules 124(1)-124(N) which are representative of functionality for participating in an online activity. For instance, the online activity modules 124(1)-124(N), when executed by the respective clients 104(1)-104(N), may be utilized to participate in online activities managed by the online activity provider 102(m) over the network. In another instance, the online activity modules 124(1)-124(N) may provide an online activity without utilizing the online activity provider 102(m) over a peer-to-peer network.

Each of the clients 104(1)-104(N), for instance, may execute a respective one of the online activity modules 124 (1)-124(N) to access the online activity provider 102(m) to play online poker. Therefore, each of the online activity modules 124(1)-124(N) may communicate with the online activity provider which hosts the online activity. In another instance, the online activity modules 124(1)-124(N) are executable to provide an online activity themselves without the use of the online activity providers 102(m). One or more of the online activity modules 124(1), for example, may be utilized to host an online activity that is accessible by the client 104(1) as well as other clients 104(n)-104(N) through execution of their respective online activity modules 104(n)-104(N), such as through a peer-to-peer network. A variety of other examples are also contemplated.

Each of the plurality of communication modules 122(1)-122(N) is also illustrated as including a respective one of a plurality of messaging modules 126(1)-126(N). The messaging modules 126(1)-126(N), when executed, may be utilized to communicate messages over the network 110 for receipt by the clients 104(1)-104(N). The messages may be configured in a variety of ways. For example, the messages communicated by the messaging modules 126(1)-126(N) may be configured as instant messages.

Instant messaging is a communication tool that enables two or more clients (e.g., clients 104(1), 104(n), 104(N)) to exchange messages via a network. For instance, when the clients 104(1)-104(N) are available at the same time over a network (e.g., a peer-to-peer network), instant messages may be exchanged in real time between the two users. In this way, the instant messages may be utilized to support a text conversation between the clients in a manner that mimics how the clients 104(1)-104(N) would participate in a typical spoken conversation.

Each of the messaging modules 126(1)-126(N) is executable such that a respective one of the clients 104(1)-104(N) may participate in an instant messaging session. For example, the messaging modules 126(1)-126(N) may be executed by the respective clients 104(1)-104(N) to send text messages and graphics (e.g., emoticons) to each other. The instant messages are typically communicated in real time, although delayed delivery may also be utilized, such as by logging the text messages when one of the clients 104(1)-104(N) is unavailable, e.g., offline. Thus, instant messaging may be though of as a combination of email and Internet chat in that instant messaging supports message exchange and may be utilized for synchronous communication, e.g., is designed for two-way live chats. For instance, like a voice telephone call, an instant messaging session may be performed in real-time such that each client may respond to each other client as the instant messages are received.

In an implementation, the messaging modules 126(1)-126 (N) communicate with each other through use of the online activity provider 102(m). The online activity manager module 112, for instance, may be executable to route instant messages between the messaging modules 126(1)-126(N). For instance, the client 104(1) may execute the messaging module 126(1) to form an instant message for communication to client 104(n). The messaging module 126(1), when executed, communicates the instant message to the online activity provider 102(m), which then executes the online activity manager module 112 to route the instant message to the client 104(n) over the network 110. The client 104(n) receives the instant message and executes the messaging module 126(n) to display the instant message.

In another instance, when one or more of the clients 104(1)-104(N) are communicatively coupled directly, one to another (e.g., via a peer-to-peer network), the instant messages are communicated without utilizing the online activity provider 102(m). Thus, as previously stated, the messaging modules 126(1)-126(N) are executable to provide an instant messaging session, either in indirect communication through use of the online activity provider 102(m) over the network 110 and/or directly over a peer-to-peer network.

The communication modules 122(1)-122(N) are illustrated as including respective online activity modules 124(1)-124(N) and respective messaging modules 126(1)-126(M) to indicate an interrelationship between the modules. For example, the online activity modules 124(1)-124(N) may communicate with respective messaging modules 126(1)-126(M) to leverage functionality provided by the messaging modules, such as to send and receive messages, form ad hoc and persistent groups, and so on. The online activity modules 124(1)-124(N), for instance, may leverage the messaging modules 126(1)-126(N) to create persistent groupings of the clients 104(1)-104(N) to participate in online activities through interaction with the persistent object system 106.

The persistent object system 106 is represented as having storage 128 for a plurality of persistent objects 130(p), where "p" can be any integer from one to "P". Each of the plurality of persistent objects 130(p) is persistent such that it continues to exist beyond termination of execution of a module that created the persistent object and/or continues to exist past a session, during which, the persistent object was created. For example, the communication module 122(1) may be executed on the client 104(1) to form and store the persistent object 130(p). Therefore, even if execution of the communication module 122(1) is terminated, the persistent object may be called the next time the client 104(1) or any other client "logs on" to the environment 100.

The persistent object 130(p) includes a plurality of client references 132(h), where "h" can be any integer from one to "H". Each client reference 132(h) corresponds to one of the plurality of clients 104(n)-104(N) that the client 104(1) desires to include for participation in the online activity. Additionally, the plurality of client references 132(h) may include a client reference to the creator of the persistent object 130(p), e.g., client 104(1). Therefore, the persistent object 130(p) may be called by one of the other clients to include the original creator of the persistent object.

The persistent object 130(p), after creation, may be stored in storage 128 such that even after termination of the execution of the communication module 122(1), the persistent object 130(p) (and more particularly data included in the persistent object) may be utilized to initiate group participation in the online activity 112(k) by the clients 104(1)-104(N) referenced by the client references 132(h). The persistent object 130(p) may also include other 134 data, such as another persistent object for another grouping, one or more actions performed by each client 104(1)-104(N) referenced by the client references 132(h) during participation in the online activity, and so on.

The persistent object 130(p) may be utilized to provide a variety of functionality. For example, by providing for persistence of client references 132(h) in the persistent object 130(p), the persistent object 130(p) may be reused to invite the clients 104(1)-104(N) to participate in the online activity without having to perform a plurality of manual steps, such as to select which of clients 104(1)-104(N) are to participate in the online activity, sending notifications that participation in the online activity is desired, and so on. Additionally, the persistent object 130(p) may be configured to be callable by any one of the referenced clients. For instance, client 104(n) may leverage the persistent object 130(p) which was created by client 104(1). Further, each client that is referenced by the persistent object 130(p) may be permitted to include a reference of another client, thereby increasing membership of a group described by the persistent object. A variety of other functionality may also be provided through examination of the persistent object 130(p), further discussion of which may be found in relation to FIGS. 5-7. Although persistent groupings have been described, other groupings may also be utilized which do not persist past expiration of an instant messaging session.

Although the persistent object system 106 is illustrated as separate from the plurality of clients 104(1)-104(N) and the online activity provider 102(m), the functionality of the persistent object system 106 may be incorporated into the environment 100 in a variety of ways. For example, the plurality of clients 104(1)-104(N) may incorporate the functionality of the persistent object system 106 such that communication over the network 110 with the online activity provider 102(m) is not required. In another example, the persistent object system 106 may be incorporated by the online activity provider 102(m), an example of which is shown in relation to FIG. 2.

The online activity modules 124(1)-124(N) may also leverage the functionality of the messaging module 126(1)-126(N) to utilize the authentication system 108 to verify that the clients 104(1)-104(N) "are who they say they are". For example, the authentication system 108 may include storage 136 for a plurality of client accounts 138(i), where "i" can be any integer from one to "I". Each of the client accounts 138(i) may include information for verifying the identity of a corresponding one of a plurality of clients 104(1)-104(N). Therefore, the identity of the clients 104(1)-104(N) may be established before permitting the clients 104(1)-104(N) to participate in the online activity, which protects against uninvited clients from participating in the online activity. Further discussion of the interaction of the online activity modules 124(1)-124(N) with respective messaging modules 126(1)-126(N) may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the techniques described below are platform-independent, meaning that the techniques may be implemented on a variety of commercial computing platforms having a variety of processors.

Figure 2:
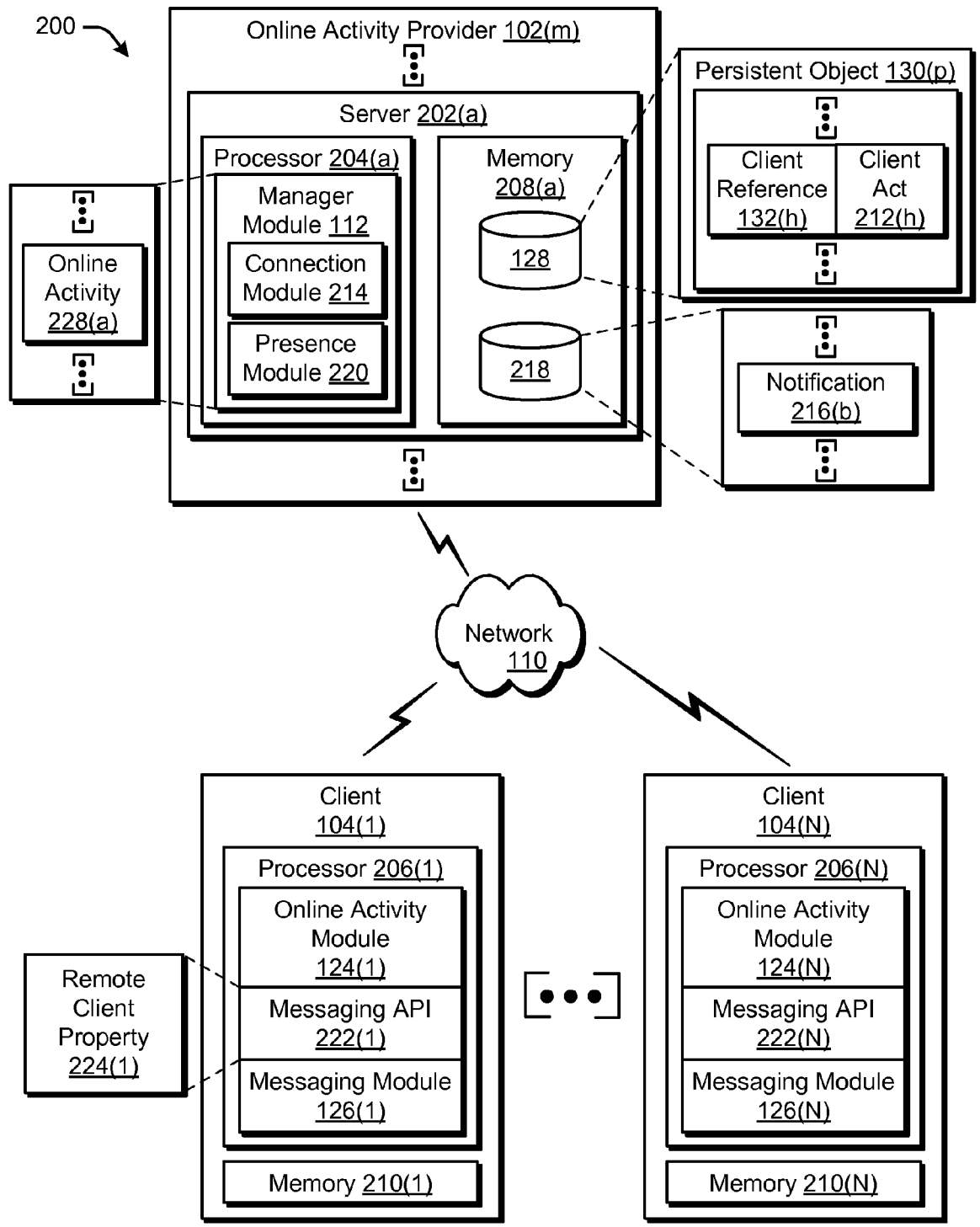
FIG. 2 is an illustration of a system in an exemplary implementation showing an online activity provider and clients of FIG. 1 in greater detail as implementing online activities to provide instant messaging and another online activity that leverages instant messaging.

FIG. 2 is an illustration of a system 200 in an exemplary implementation showing the online activity provider 102(m) and the clients 104(1)-104(N) of FIG. 1 in greater detail as implementing online activities to provide instant messaging and another online activity that leverages instant messaging. The online activity provider 102(m) is illustrated as implemented by a plurality of servers 202 (a), where "a" can be any integer from one to "A" and the clients 104(1)-104(N) are illustrated as client devices. The servers 202(a) and the plurality of clients 104(1)-104(N) are illustrated as having a respective processor 204(a), 206(1)-206(N) and a respective memory 208(a), 210(1)-210(N).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(a), 210(1)-210(N) is shown, respectively, for the servers 202(a) and the clients 104(1)-104(N), a wide variety of types and combinations of memory may be employed, such as random access memory (RAM), hard disk memory, removable medium memory, and so forth.

In the system 200 of FIG. 2, the online activity provider 102(m) is illustrated as incorporating the functionality of the persistent object system 106 by including storage 128 in the memory 208(a) for the plurality of persistent objects 130(p). Each persistent object 130(p) includes a plurality of client references 132(h) and a description of a client act 212(h) performed by the referenced client. For example, the client act 212(h) may describe the most recent text message sent by the client referenced by the client reference 132(h), a move made by the client during an online game, and so on.

The persistent objects 130(p) may be configured to provide a variety of different functionality. The persistent object 130(p), for instance, may be examined by the online activity manager module 112 (hereinafter "manager module) in response to a request from the client 104(1) to initiate a group to perform an online activity, which is this instance is an instant messaging session in conjunction with an online game. The manager module 112 is illustrated as including a connection module 214 which represents functionality for managing a communicative connection between the clients 104(1)-104(N) and the online activity provider 102(m), and thus may act as a "switchboard" between the clients 104(1)-104(N) themselves, as well as the clients 104(1)-104(N) with the servers 202(a).

Once the client 104(1) has successfully obtained a connection with the servers 202(a), for instance, the client 104(1) may request initiation of a group online activity of clients referenced by the persistent object 130(p). Therefore, the manager module 112 may be executed to query the persistent object 130(p) to determine which other clients are to participate in the online activity. Based on this determination, the manager module 112 may select one or more of a plurality of messages configured as notifications 218(b), where "b" can be any integer from one to "B", for communication to the referenced clients.

The manager module 112, for example, may select a notification 218(b) from storage 220 in the memory 208(a) for communication over the network 110 to client 104(N). The notification may then be output through execution of the messaging module 126(N) on the client 104(N). The client 104(N) may then decide whether to participate in the instant messaging session or an online game in conjunction with the instant messaging session based on the notification. In this example, the persistent object 130(p) is utilized to form the notification 218(b) which includes an identification of each of the clients which are to participate in the online activity, i.e., which clients were invited to participate in the online activity. If the client 104(N) is not currently available, the notification 218(b) may be stored for later output by the client 104(N). For example, the notification 218(b) may be sent via email for output by the communication module 122(N) of FIG. 1 the next time the client 104(N) accesses the network 110. A variety of other techniques may also be employed.

The manager module 112 is also illustrated as including a presence module 220. The presence module 220 represents functionality for determining which of the clients 104(1)-104(N) are currently participating in the online activity. For example, the presence module 220 may be executed to monitor which of the clients "log on" and "log off" the servers 202(a) to participate in the instant messaging session. In another example, the presence module 220 may also be executed to determine which acts are being and/or were performed by participants in the instant messaging session. For instance, the presence module 220 may determine that the client 104(1) is participating in the instant messaging session and is also playing an online game with another client 104(N) during the instant messaging session. In another instance, the presence module 220 may track instant messages sent by each of the clients.

The presence module 220 may store data for later retrieval. For example, the presence module 220 may store this data as a part of the persistent object 130(p) as illustrated, may store this data separately from the persistent object 130(p), and so on. For instance, the manager module 112 (and more particularly the presence module 220) may be configured such that the client act 224(h) data is not persisted in the persistent object 130(p), but rather is stored separately from the persistent object 130(p). Therefore, the client act 224(h) data may be erased when the instant messaging session is terminated without affecting the persistent object 130(p). A variety of other instances are also contemplated.

The client act 224(h) data may also be utilized to provide a variety of other functionality. Continuing with the previous example in which client 104(N) was invited to participate in an instant messaging session with client 104(1), when the client 104(N) "logs on" to the server 202(a) to participate in the instant messaging session, the presence module 220 may communicate client act 224(h) data in another one of the plurality of notifications 218(b) to client 104(N). Therefore, this other notification may describe acts being performed and/or were performed by other clients (e.g., client 104(1)) which are already participating in the online activity. In this way, the client 104(N) may be brought "up-to-date" as to the current status of the online activity. Further discussion of communication of the other notification to the client when joining the online activity may be found in relation to FIGS. 6-7.

Each of the clients 104(1)-104(N) is illustrated as executing a respective online activity module 124(1)-124(N) and a respective messaging module 126(1)-126(N) on a respective processor 204(1)-204(N), which are also storable in memory 210(1)-210(N). Each of the messaging modules 126(1)-126(N) is also illustrated as having a messaging application programming interface (API) 222(1)-222(N) which is representative of functionality exposed for accessing the respective messaging modules 126(1)-126(N) by external modules, e.g., applications. The messaging APIs 222(1)-222(N) may support a wide variety of functionality.

The messaging API 222(1), for instance, may support a property referred to as "remote client" 224(1) such that a sender of data may be identified for "N-way" applications, such as an online game accessed by the plurality of clients 104(1)-104(N). For example, an object model may be employed by the messaging module 126(1), in which, a channel object is utilized to configure a channel between the clients 104(1)-104(N) for communication. The remote client 224(1) property may be added to the channel object. In an implementation, the "remote client" property is a read-only property that returns a user object that contains a value when any of the following events are fired:

| When this Event Fires: | Remote Client contains this value: |
|---|---|
| OnDataReceived | Client who sent the data |
| OnMessageReceived | Client who sent the message |
| OnRemoteAppClosed | Client who closed a session |
| OnRemoteAppLoaded | Client who invoked Channel.Initialize |

Therefore, with this enhancement to the object model, application developers (e.g., developers of the online activity modules 124(1)-124(N)) may simply check one additional property to determine which client originated the event. Further discussion of the communication of the online activity modules 124(1)-124(N) through the messaging APIs 222(1)-222(N) with the messaging modules 126(1)-126(N) may be found in relation to the following procedures.

Exemplary Procedures

The following discussion describes multi-participant online activity techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
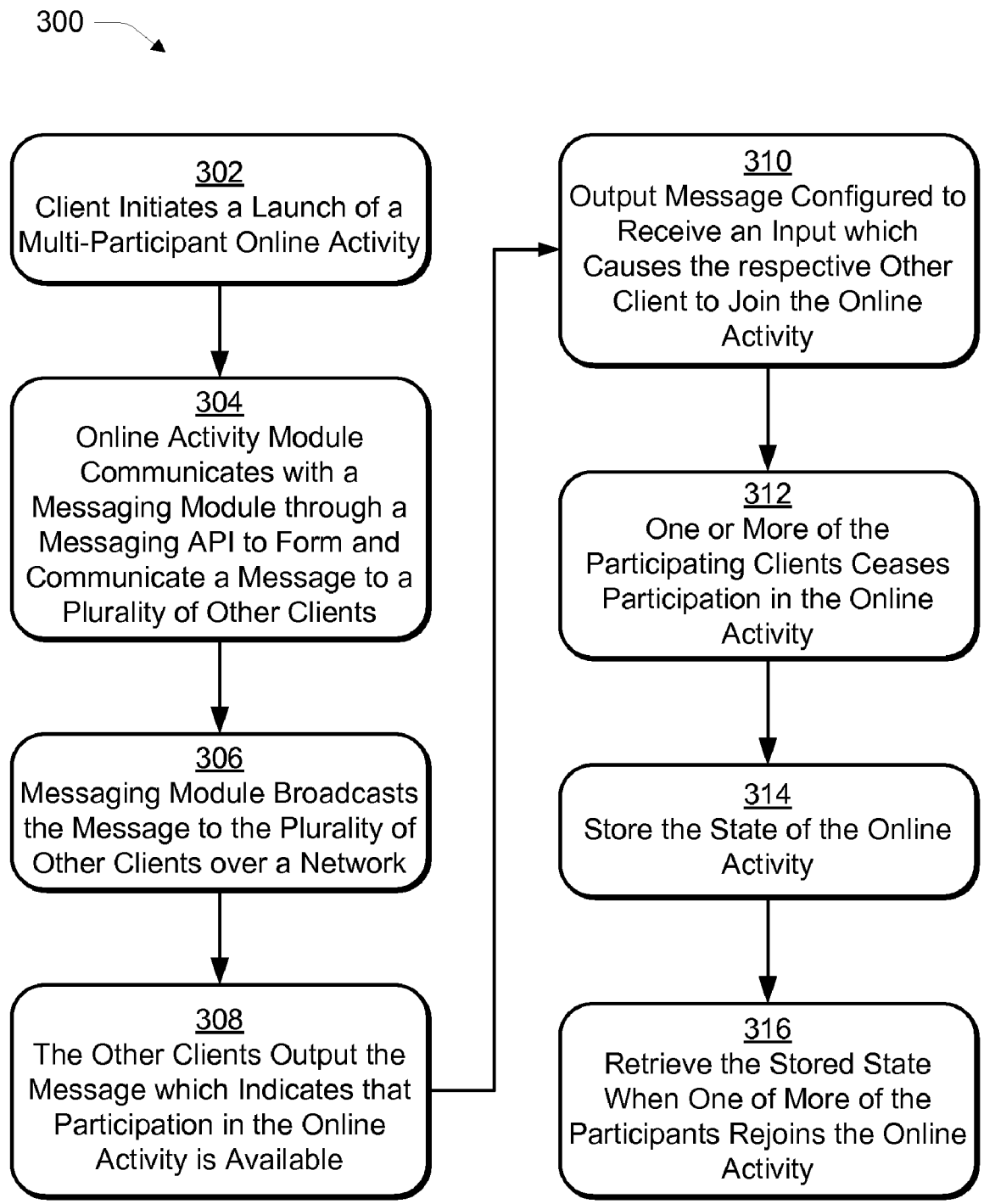
FIG. 3 is a flow diagram depicting a procedure in an exemplary implementation in which a multi-participant activity is initiated and a state of the activity is stored when one or more participants cease participation in the activity.

FIG. 3 is a flow diagram depicting a procedure 300 in an exemplary implementation in which a multi-participant activity is initiated and a state of the activity is stored when one or more participants cease participation in the activity. A client initiates a launch of an online activity module (block 302). For example, the client may launch an online activity module which hosts the online activity, such as over a peer-to-peer network. In another example, the client may utilize the online activity module to interact with an online activity provider 102(m) which hosts the activity over the network 110, such as through execution of the online activity manager module 112. A variety of other examples are also contemplated The online activity module communicates with a messaging module through a messaging API to form a plurality of messages to a plurality of other clients (block 304). For instance, the online activity module 124(1) may provide references to a group of other clients which are permitted to participate in the online activity via the messaging API 222(1). The messaging module 126(1), upon receipt of these references (e.g., client alias, network address, and so on) forms communications which are broadcast over the network 110 to the referenced clients 104(n)-104(N) (block 306). It should be noted that in this example, the messages (e.g., instant messages) are sent to a plurality of other clients, instead of to a single other client such that three or more clients may participate in the online activity.

The other clients, upon receipt of the respective message, outputs the message in a user interface such that the client is informed that participation in the online activity is available (block 308). For example, if each of the other clients is already executing a respective messaging module, the message may be displayed during the conversation experience that gives each user in the conversation a way to join the multi-participant online activity. In another example, receipt of the message may be utilized to automatically invoke a method that starts an instant messaging conversation with the selected group of clients specified by the initiating client. If one or more of the clients have a version of the messaging module which does not support the online activity, the message may include directions on where to obtain the updated version and/or automatically install the updated version once accepted by the client. A variety of other examples are also contemplated.

The message, when output, may also describe which other clients are to participate in the online activity. For instance, the message may indicate which client initiated the online activity and which other clients are invited to participate in the online activity. In this way, each of the clients is informed as to the contemplated roster of clients for participation in the online activity.

The message, when output, may also be configured to receive an input which causes the respective other client to join the online activity (block 310). For example, the message may include a display of a button which, when selected, causes communication of another message to a source of the online activity which specifies that the client wishes to participate in the online activity. In this way, each of the plurality of other clients may join the initiating client in participating in the online activity.

A state of the online activity may also be stored such that participation in the online activity may continue even as the presence of participants in the online activity changes. For example, one or more of the participants may cease interaction with the online activity (block 312). In response to the change in presence of the one or more participants, a state of the online activity is stored (block 314), such as a current situation and history of an online game. Therefore, the stored state may be retrieved when the one or more participants rejoin the online activity (block 316) such that the participants may "continue where they left off". Further, this state may be persisted between sessions such that the users may play a game even if the users are not online at the same time, e.g., by alternating turns. A variety of other examples are also contemplated.

Figure 4:
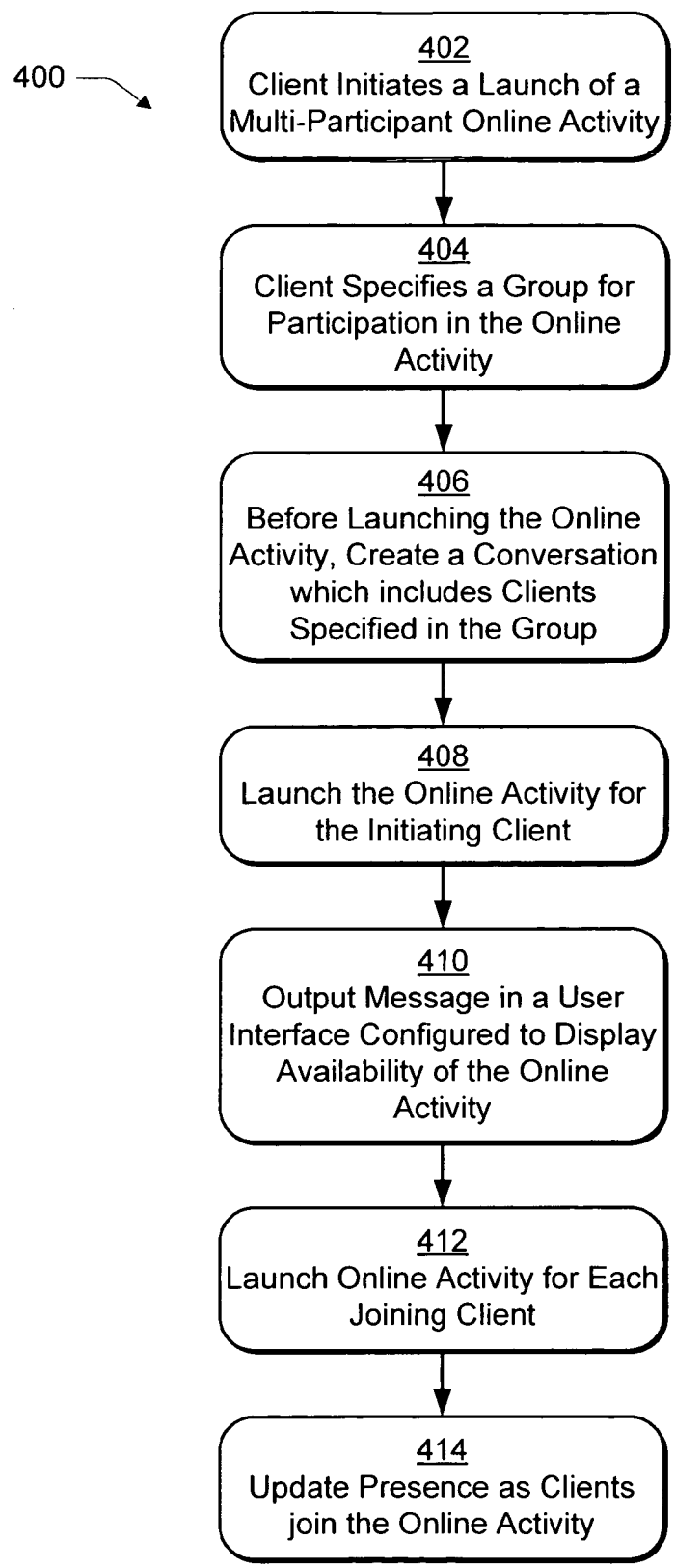
FIG. 4 is a flow diagram depicting a procedure in an exemplary implementation in which an instant messaging session is utilized to form a group for participation in an online activity.

FIG. 4 is a flow diagram depicting a procedure 400 in an exemplary implementation in which an instant messaging session is utilized to form a group for participation in an online activity. A client initiates a launch of a multi-participant online activity (block 402). For example, the client may initiate a launch of an online activity module on the client which hosts the online activity. In another example, the client may interact with an online activity provider 102(m) over a network which hosts the online activity.

The client then specifies a group for participation in the online activity (block 404). For example, the client may specify the names of participants to form an ad hoc group which does not survive past the current session utilized to form the group, e.g., a current instant messaging session. In another example, a persistent object may be utilized, further discussion of which may be found in relation to FIGS. 5-7.

Before launching the online activity, a conversation is created which includes clients specified in the group (block 406). For example, an instant messaging session may be initiated between the specified clients which references each of the clients that are authorized to participate in the online activity. If an instant messaging session has already been created (e.g., the client is launching the online activity from an existing conversation window), the existing session may be leveraged such that the clients may accept participation in the online activity before launching the online activity.

The online activity is launched for the initiating client (block 408). For instance, the online activity may be launched such that the initiating client is the first participant with each of the specified clients to follow as subsequent participants in the online activity.

A message is then output in a user interface which indicates that the online activity is available to each of the specified clients (block 410). For example, another instant message may be communicated that the online activity has been launched and the clients may now join the activity. As clients join, the online activity is launched for each joining client (block 412). For example, each client may launch a respective online activity module to participate in the online activity.

As clients join and leave the online activity, presence of the clients may also be updated (block 414). For example, messages may be communicated each time a client joins or ceases participation in the online activity that indicates the change and described which clients are still participating in the online activity. In this way, the participating clients are kept updated as to the current state of participation in the online activity.

Figure 5:
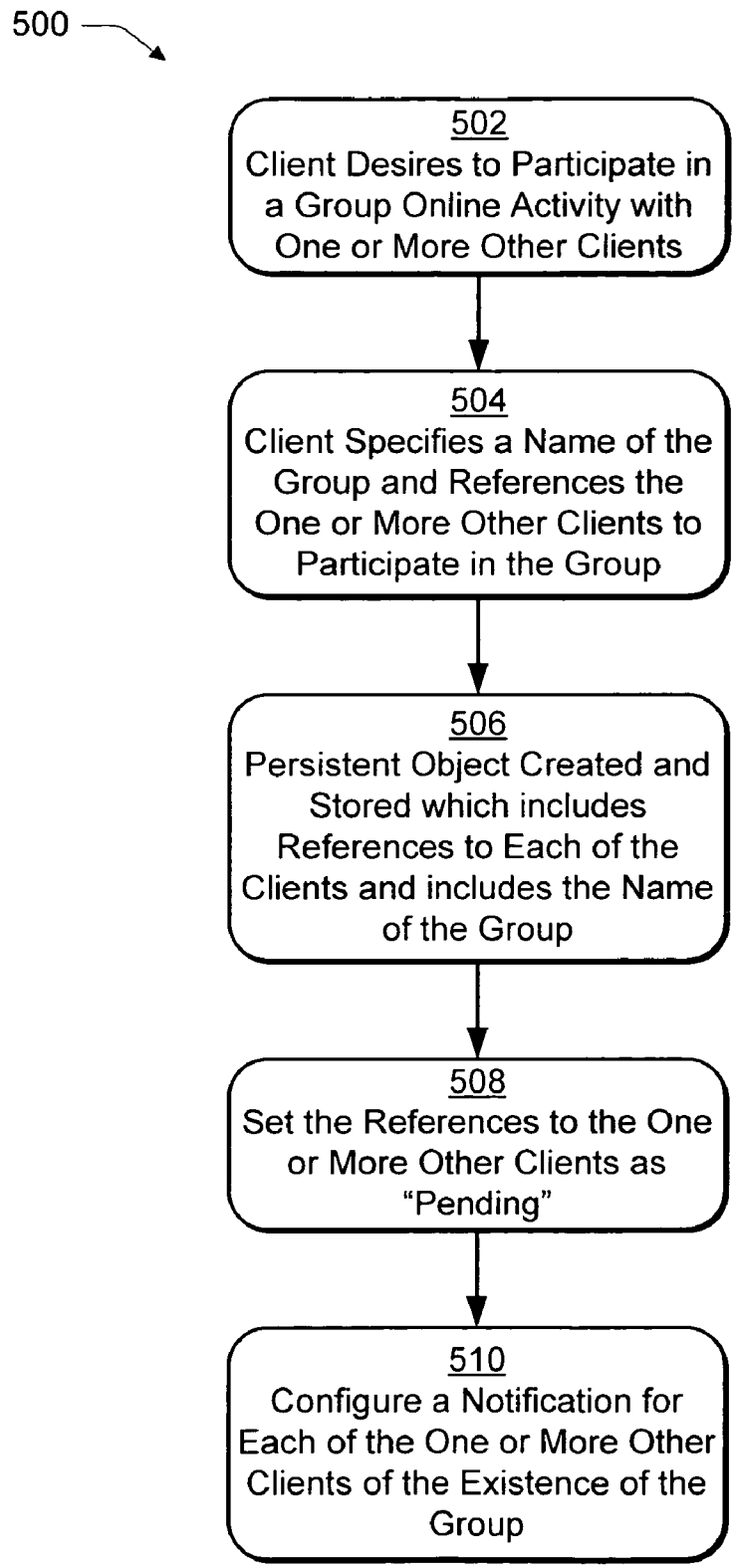
FIG. 5 is a flow diagram depicting a procedure in an exemplary implementation in which a persistent object is created by a client to automatically cause notifications to be configured for other clients referenced by the persistent object.

FIG. 5 is a flow diagram depicting a procedure 500 in an exemplary implementation in which a persistent object is created by a client to automatically cause notifications to be configured for other clients referenced by the persistent object. First, a client desires to participate in a group online activity with one or more other clients (block 502). For example, the client may wish to participate in an online game with a plurality of other clients.

The client may specify a name of the group and provide a reference (e.g., a network address) to the one or more other clients which are to participate in the group (block 504). For example, the client may name the group such that the other clients can readily determine a purpose of the online activity (e.g., poker, meeting to discuss <topic>, and so on) and provide a network address (e.g., an email address) for locating each of the other clients. In another example, the reference is a machine readable name, such as a globally unique identifier.

A persistent object is then created and stored which includes references to each of the clients and which includes the name of the group (block 506). For example, the messaging module may be executed to provide a user interface, from which, the client may receive the name of the group and the network addresses. In another example, the specifying and the creation of the persistent object may be performed automatically. For instance, the client may be actively participating in the online activity with the other clients. The client may then receive an input which selects a "create group" function. By selecting the "create group" function, the client may automatically create a persistent object which includes a reference to each client that is currently participating in the online activity and a name of the online activity. In another instance, the persistent object includes a reference to each client that has participated in the online activity during a session of the online activity. Thus, in these instances, the client does not manually provide the references (e.g., network addresses) of the client and the other client. A variety of other techniques may also be utilized to create the persistent object.

After creation of the persistent object, references to the one or more other clients are set as "pending" (block 508). A notification is also configured for each of the other clients (i.e., the "pending" clients) to invite the other clients to participate in the online activity (block 510). For example, the other 134 data in the persistent object 130($p$) may describe whether a client referenced by the persistent object 130($p$) has accepted the invitation to participate in the online activity, has rejected the invitation, has not yet responded to the invitation, and so on. This information may describe the "presence" of the group in relation to the online activity, and may be communicated to the clients to apprise the clients as to a state of participation in the online activity. Further discussion of presence of the group may be found in relation to the following figure.

Figure 6:
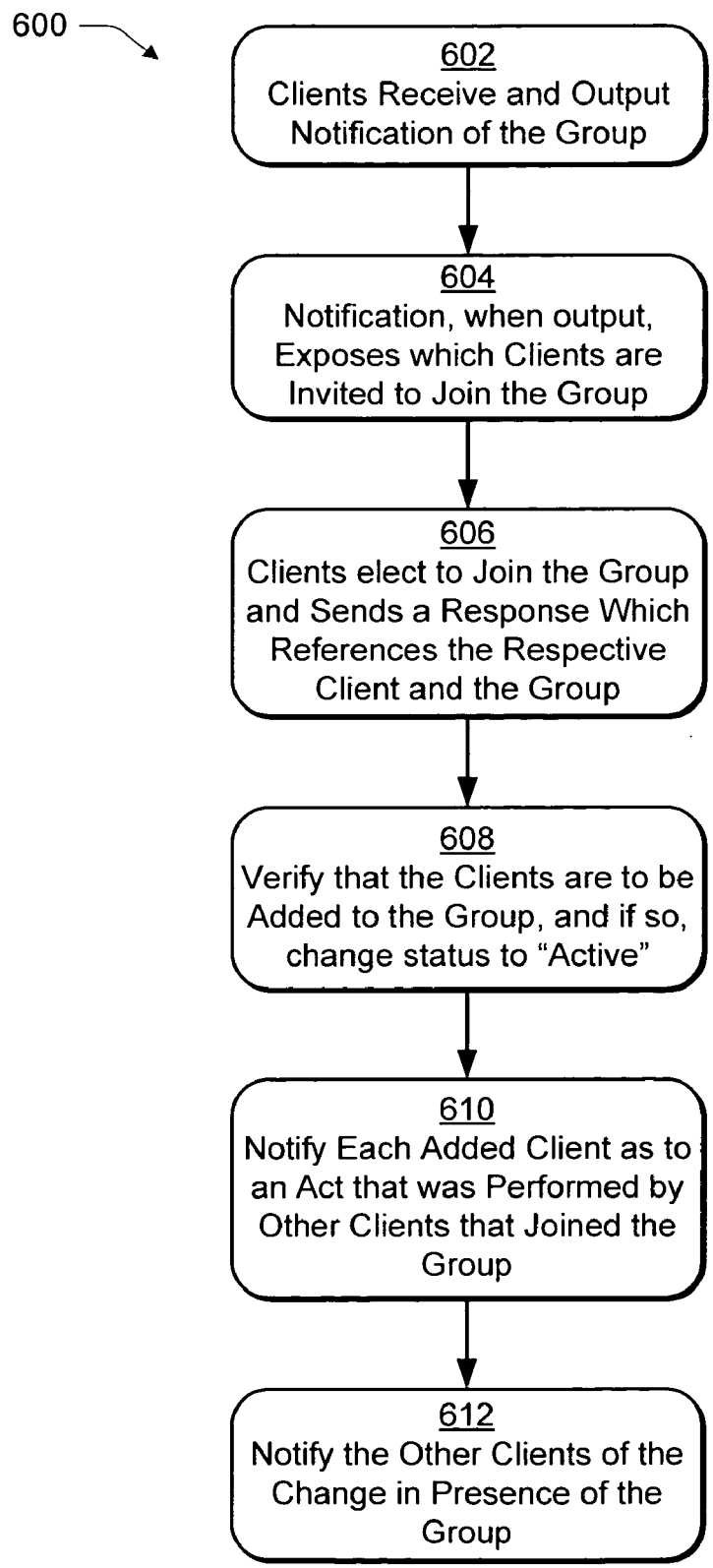
FIG. 6 is a flow diagram depicting a procedure in an exemplary implementation in which a client receives a notification configured by the procedure of FIG. 6 to participate in an online activity.

FIG. 6 is a flow diagram depicting a procedure 600 in an exemplary implementation in which a client receives a notification configured by the procedure 500 of FIG. 5 to participate in an online activity. Clients receive and output a notification of the group (block 502). For example, clients 104($n$), 104(N) may receive a notification from the server 202($a$) of a group which is being formed to participate in an online activity which was initiated by client 104(1). The notification, when output, exposes which clients are invited to join the group (block 604). For example, the notification may include each client reference 132($h$) included in the persistent object 130($p$) which was utilized to form the group. The notification may also indicate which client initiated the group, since the client is likely to be available for active participation in the online activity.

Based on the output, one or more of the clients elect to join the group and send a response which references the respective client and the group (block 606). For example, the client may reply to the notification. The reply may reference the client and indicate whether the client wishes to participate in the online activity. In an implementation, the reply may be automatically formed from the notification. For example, the notification may include buttons for accepting or declining participation in the online activity, the selection of which causes the reply to be configured and communicated back to the server 202($a$).

The clients are then verified for participation in the online activity, and if so, the status of the respective client is changed to "active" (block 608). For example, the server 202($a$) may communicate with the authentication system 108 to determine whether the identity of the clients 104($n$), 104(N) is valid, such as by comparing a user login ID and password. The server 202($a$) may also compare the identity to the client reference 132($h$) to determine whether the clients are permitted to join the group. If the clients are permitted and are valid, the server 202($a$) may set the client's status to "active" indicating that the client is now able to participate in the online activity.

Each added client is then notified as to an act that was performed by other clients that joined the group (block 610). For example, the notification may be formed for communication to the added client which describes acts that were performed by other clients in conjunction with the online activity before the added client joined the group, such as a most recent instant message, change in status (e.g., the other client just joined the group), and so on.

The other clients are also notified of the change in presence of the group (block 612). For example, notifications may be sent to each client that is currently participating in the group that the added client just joined the group. Thus, each client that participates in the group may be kept informed as to the presence (e.g., membership) of the group with respect to the online activity.

Figure 7:
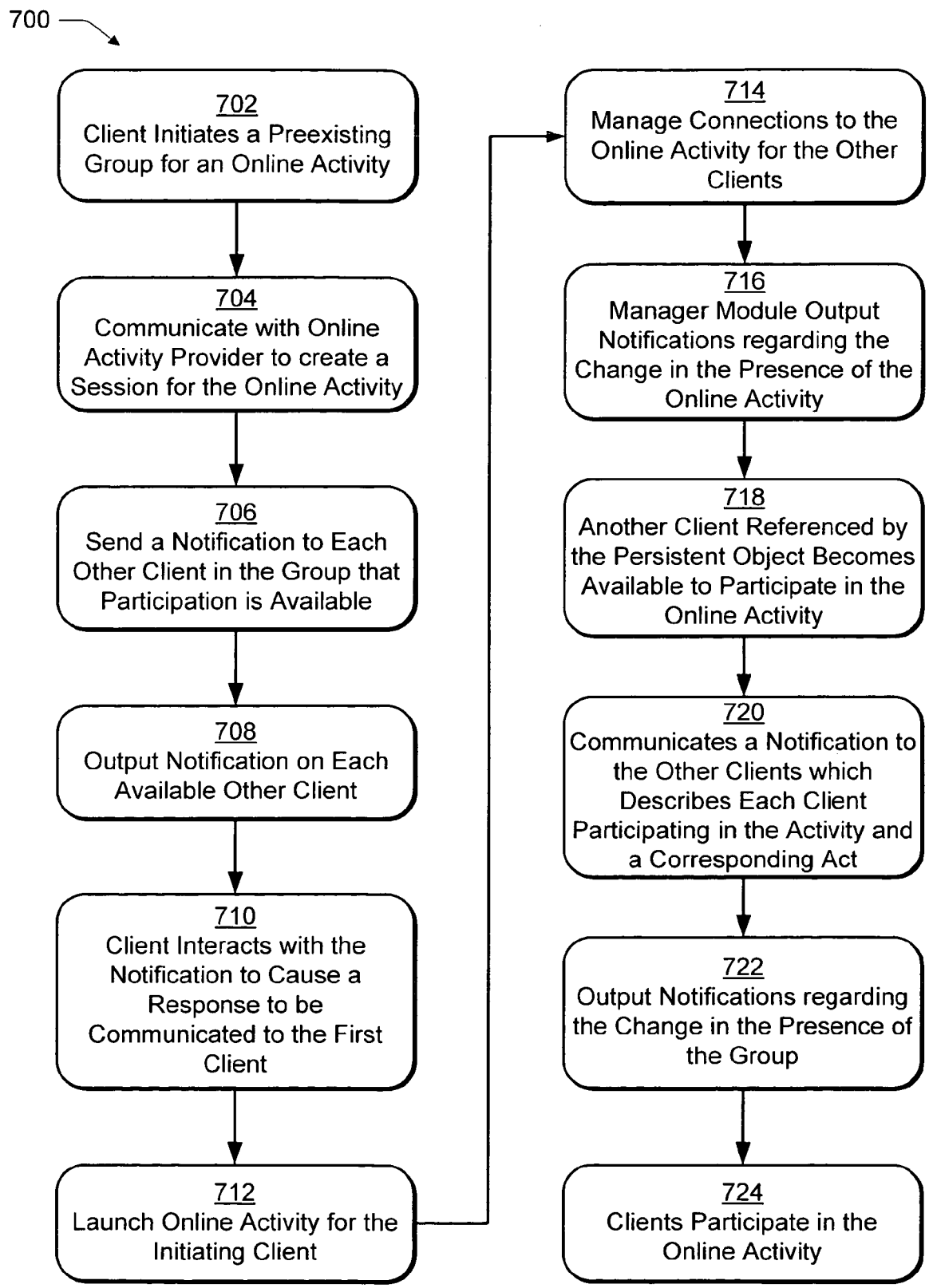
FIG. 7 is a flow diagram depicting a procedure in an exemplary implementation in which an instant messaging session is initiated for participation by a plurality of clients over a peer-to-peer network.

FIG. 7 is a flow diagram depicting a procedure 700 in an exemplary implementation in which an instant messaging session is initiated for participation by a plurality of clients over a peer-to-peer network in an online game. During the discussion of procedure 700, reference will also be made to the exemplary implementations of FIGS. 8-13.

Figure 8:
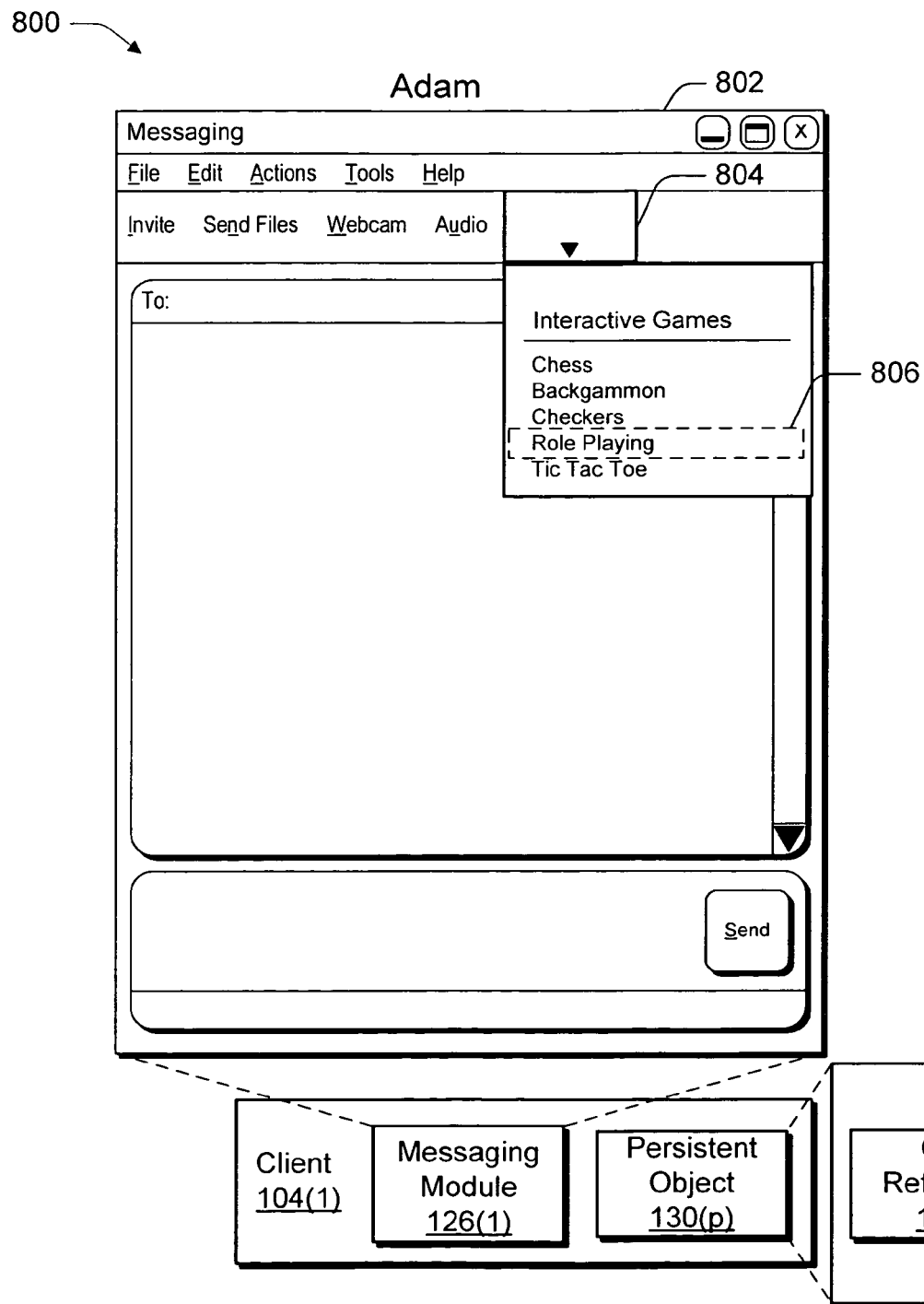
FIG. 8 is an illustration of an exemplary implementation in which a client executes a messaging module to output a user interface for initiating participation in an online activity in conjunction with an instant messaging session.

A first client 104(1) initiates a preexisting group (block 702). For example, FIG. 8 is an illustration of an exemplary implementation 800 in which the client 104(1) executes the messaging module 126(1) to output a user interface 802 for initiating participation in on online role-playing game in conjunction with an instant messaging session. The user interface 802 includes a launch menu item 804, which when selected, causes display of a drop-down menu 806 which includes a plurality of items for selection by the client 104(1). One such item is illustrated as "role playing" 806, which when selected, causes the messaging module 126(1) to initiate an instant messaging session between a plurality of clients referenced by the persistent object 130(p). Thus, in this instance a conversation window already exists and therefore provides a context for the online activity.

The first client then communicates with an online activity provider to create a session for the online activity (block 704). For example, the messaging module 126(1) may communicate with the manager module 122 over the network 110 to ask for creation of a named session for the online activity. The client 104(1) may provide a name (e.g., a GUID) for the session. The instance of the messaging module 126(1) that created the session is then connected to the named session, which may persist for the duration of the online activity and provide roster management for the participants in the online activity.

Figure 9:
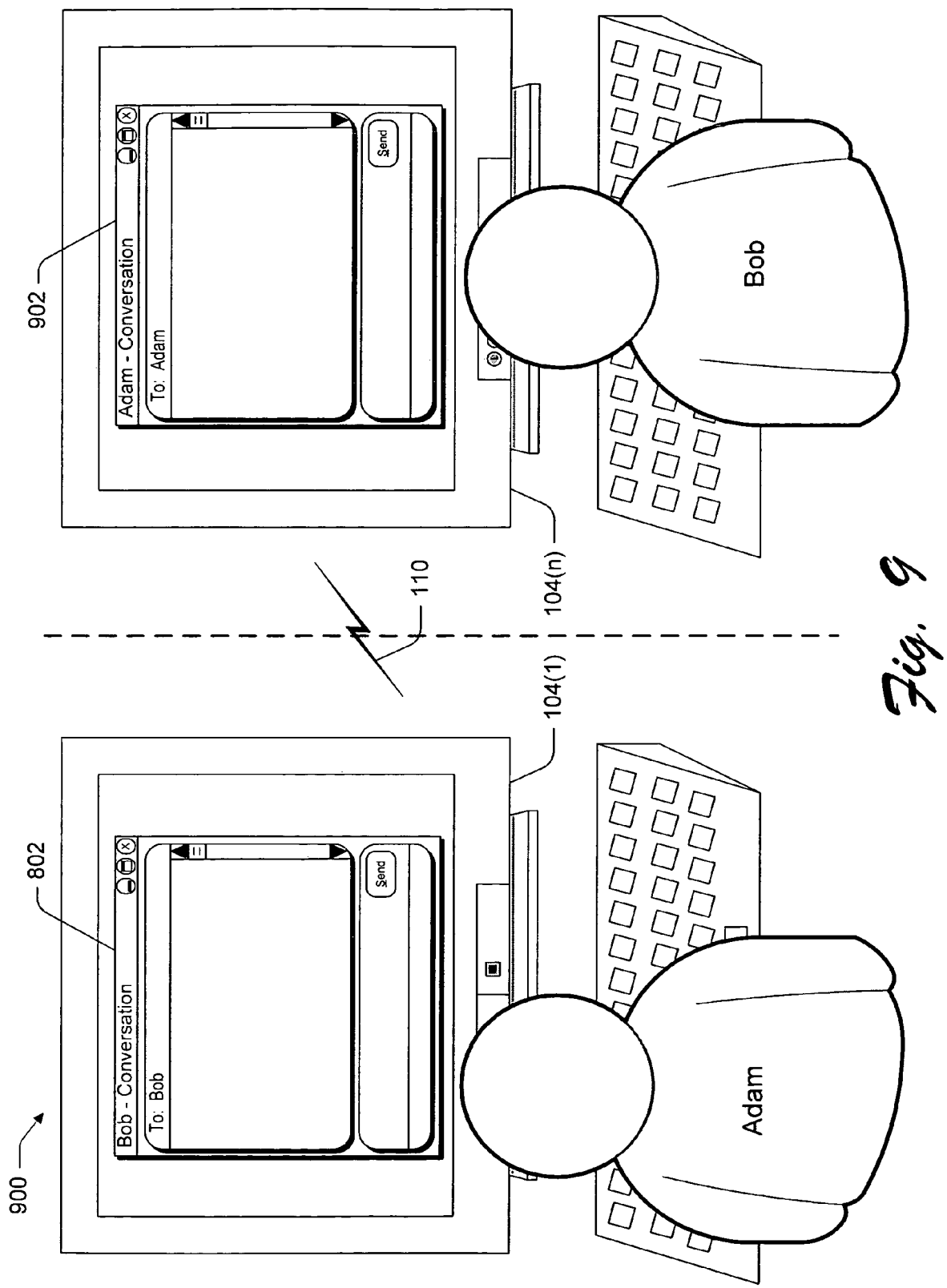
FIG. 9 is an illustration of an exemplary implementation in which a client of FIG. 2 is communicatively coupled to another client.

A notification is sent to each other client referenced by the persistent object 130(p) which indicates that participation in the group is available (block 706). For example, FIG. 9 is an illustration of an exemplary implementation 900 in which client 104(1) of FIG. 6 is communicatively coupled to another client 104(n) over the network 110. The other client 104(n) in this instance is referenced by the persistent object 130(p) of FIG. 8, and likewise includes a user interface 902 for output. Client 104(1) is illustrated as being utilized by "Adam" and client 104(n) is illustrated as being utilized by "Bob".

Client 104(1) sends the notification over the network 110 to client 104(n) for output. The notification may be configured in a variety of ways. For instance, an extensible markup language data structure may be utilized, an example of which is as follows:

```
<Session>
    <SessionName> GUID </SessionName>
    <SessionRoster>
        <Client>PUID, Friendly Name </User>
        <Client>PUID, Friendly Name </User>
        <Client>PUID, Friendly Name </User>
    </SessionRoster>
    <AppID> AppID </AppID>
    <LocalAppInfo> RegistryKey </LocalAppInfo>
</Session>
```

Thus, as shown in the above data structure, the notification may indicate each invited participant and a module (e.g., an application) which is to be utilized by the client to participate in the online activity, such as a particular online activity module.

Figure 10:
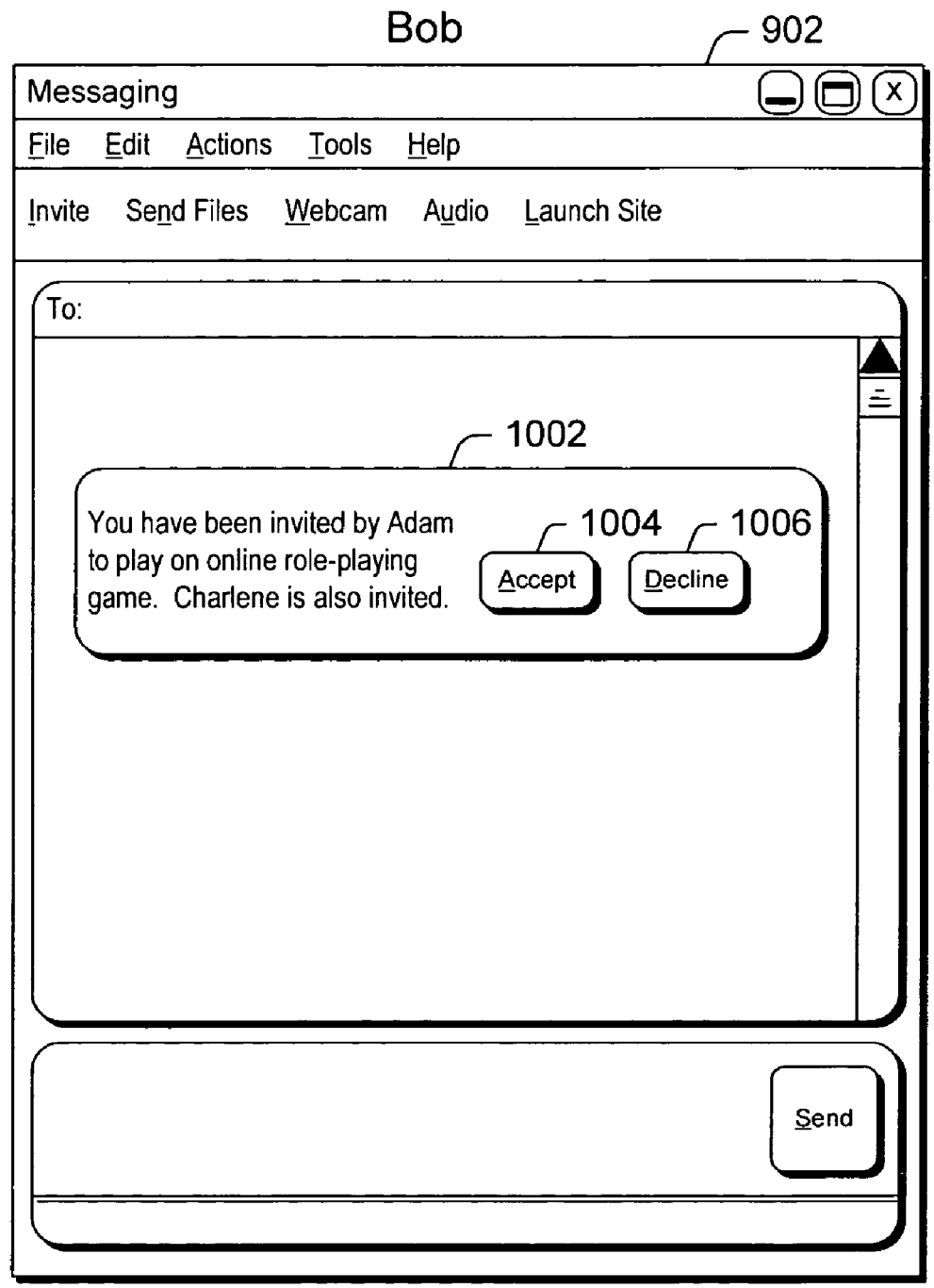
FIG. 10 is an illustration of an exemplary implementation in which a user interface of the other client of FIG. 9 is shown as outputting the notification received from the client.

The notification may then be output on each available client which is configured for selection by the client to participate in the group (block 708). FIG. 10, for instance, is an illustration of an exemplary implementation 1000 in which the user interface 902 of the other client 104(n) of FIG. 9 is shown as outputting the notification 1002 received from the client. The notification 1002 in this instance indicates an originator of the invitation (e.g., Adam), and also indicates another client which has been invited to participate in the online activity. The notification 1002 is also illustrated as including an "accept" 1004 button and a "decline" 1006 button. Selection of the decline button causes a response to be communicated to the client 104(1) (e.g., Adam) that the other client 104(n) (e.g., Bob) does not wish to participate in the discussion group at this time. However, the other client 104(n) may wish to participate at a later time, and may then join the activity then. Thus, in this example the roster of the online activity is dynamic such that changes may be made to the roster during performance of the online activity. The client may also interact with the notification (e.g., select the accept button 1004) to cause a response to be communicated to the first client 104(1) indicating acceptance of the invitation (block 710).

The online activity is launched for the first client (block 712), e.g., the role-playing game. For instance, the online activity module 124(1) may provide functionality for interacting through the messaging module 126(1) with the online activity provider 102(m). It should be noted that this may be performed at least in part during, before, or after the sending, outputting and interaction with the notifications by the other client (blocks 706-710).

Figure 11:
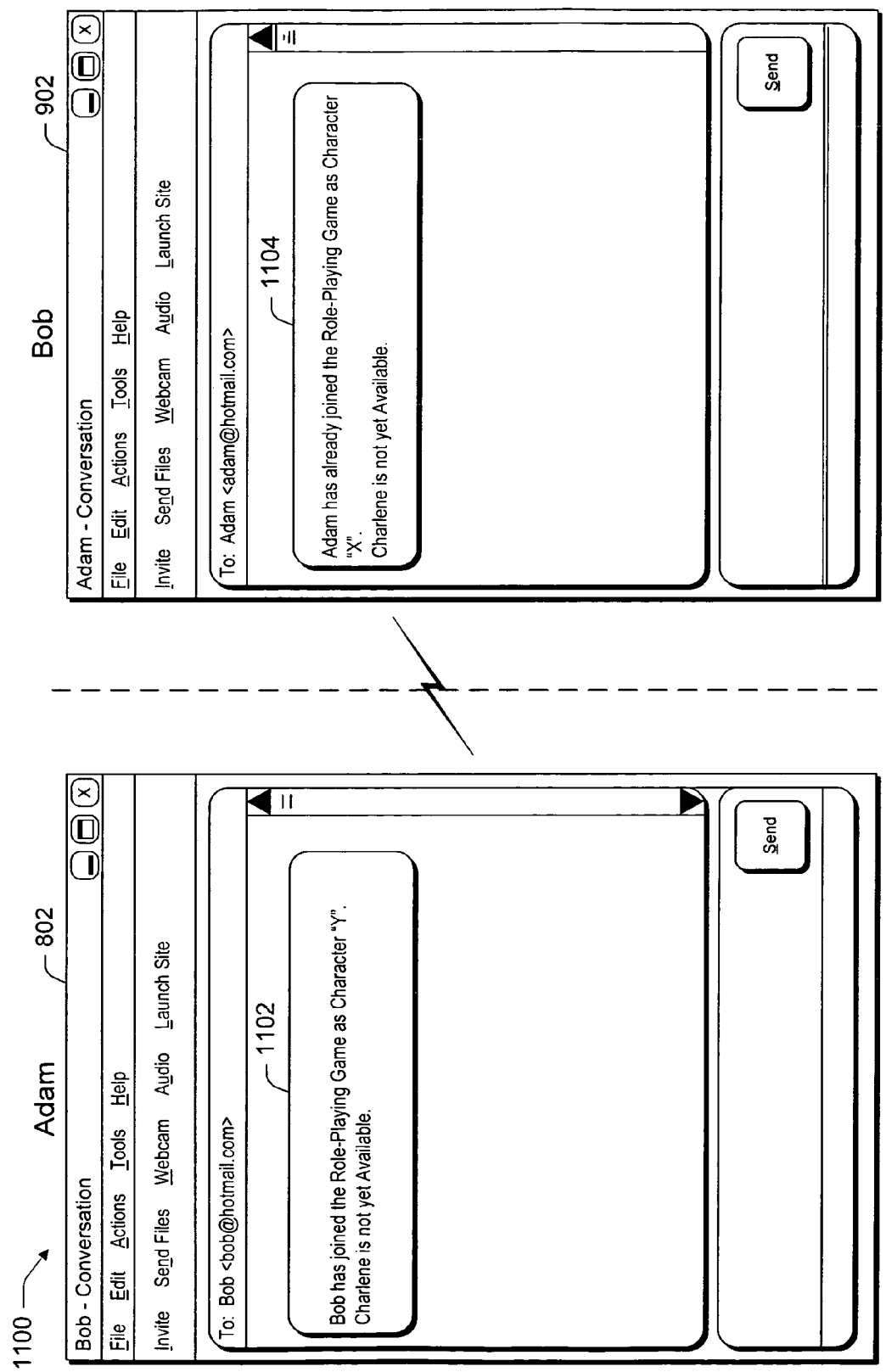
FIG. 11 is an illustration of an exemplary implementation in which the user interface of the client and the user interface of the other client each output notifications which relate to a change in presence of the online activity.

The manager module 112 of the online activity provider 102(m) in this example may then manage connections to the online activity for the other clients (block 714). For example, the manager module 112 may manage the roster of the online activity and output notifications regarding a change in presence of the online activity (block 716). FIG. 11, for example, is an illustration of an exemplary implementation 1100 in which the user interface 802 of the initiating client 104(1) and the user interface 902 of the other client 104(n) output notifications 1102, 1104 which relate to the change in presence of the discussion group.

The notification 1102 output by the first client 104(1) in the user interface 802 describes that Bob has joined the role-playing game as character "Y", but another client referenced by the persistent object 126(g) (illustrated as "Charlene") is not yet available. Thus, Adam is informed as to the current membership of the online activity (e.g., the role-playing game) and acts performed by the clients.

The notification 1104 output by the other client 104(n) also describes the current membership of the online activity. Likewise, the notification 1104 may also describes acts which were performed by one or more participants of the online activity, which is illustrated in FIG. 11 that Adam is character "X". Thus, the joining client (i.e., Bob) is informed as to who is participating in the online activity and acts being performed in conjunction with the online activity.

Figure 12:
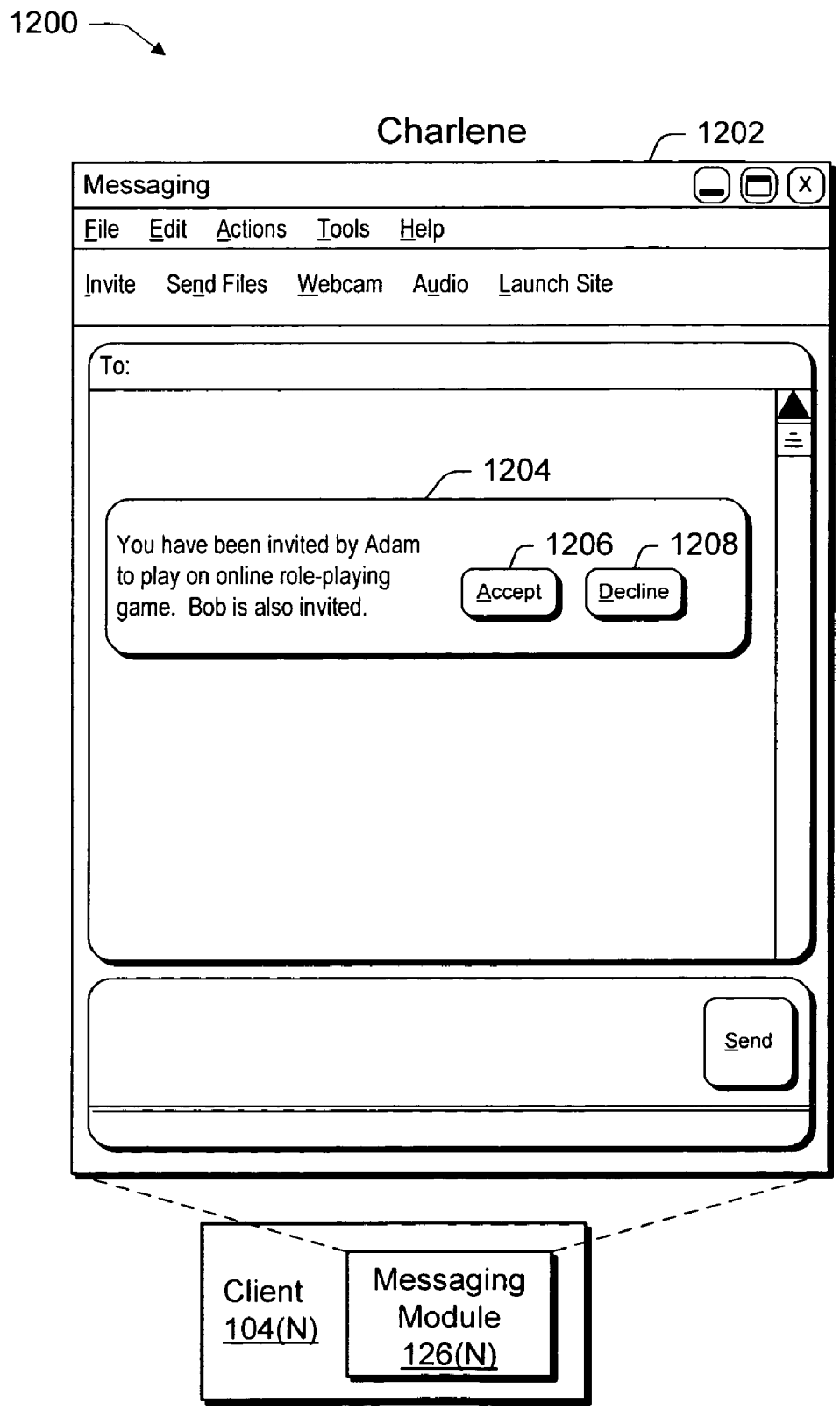
FIG. 12 is an illustration of an exemplary implementation in which another one of the plurality of clients of FIG. 2, when available to participate in the instant messaging session, outputs a notification received from the client.

Another client referenced by the persistent object then becomes available to participate in the group (block 718). FIG. 12, for example, is an illustration of an exemplary implementation 1200 in which client 104(N), when available to participate in the instant messaging session, outputs a notification 1202 received from the initiating client 104(1). In this implementation, this client 104(N) was not available when the notifications that participation in the group were initially sent (block 706). Instead, the notification 1204 was stored in a queue for output by the client 104(N), through execution of the messaging module 126(N), when the client 104(N) became available. The notification 1204 is similar to the notification 1002 of FIG. 10, and includes an accept 1206 button and a decline 1208 button. As before, selection of either button causes a response to be sent to the online activity provider 102(m) which indicates whether the client 104(N) has accepted or declined the invitation.

Figure 13:
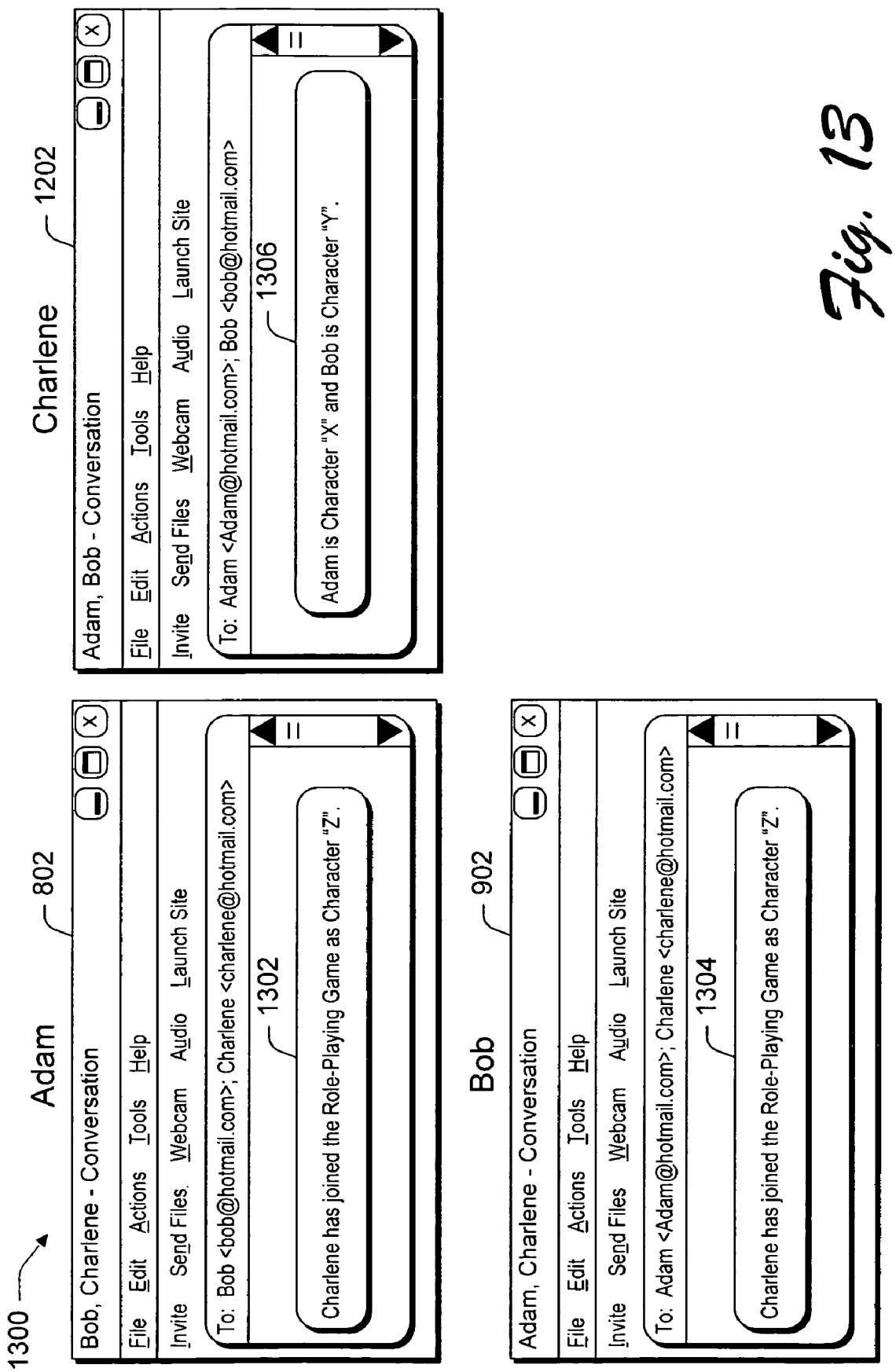
FIG. 13 is an illustration of an exemplary embodiment in which user interfaces are shown for the respective clients which output notifications that relate to the change in presence of the group.

For example, upon receipt of a response which accepts participation in the group, the online activity provider 102(m) communicates a notification to the other clients (e.g., the third client) which describes each client that is participating in the group and a corresponding action performed by the client (block 720). Thus, each of the other clients may output a notification regarding the change in presence of the group (block 722). FIG. 13, for instance, is an illustration of an exemplary embodiment 1300 in which user interfaces 802, 902, and 1202 are shown for the respective clients 104(1), 104(n), 104(N) which relate to the change in presence of the group.

The user interface 802 of client 104(1) (e.g., Adam) outputs a notification 1102 which indicates that client 104(N) (e.g., Charlene) has joined the role-playing game as character "Z". Likewise, the user interface 902 of client 104(n) (e.g., Bob) also outputs a notification 1304 which indicates that Charlene has joined the discussion group. A notification 1306 output in the user interface of client 104(N) (e.g., Charlene) indicates that Adam is character "X" and Bob is character "Y". At this point, each of the clients (i.e., Adam, Bob, and Charlene) participates in the instant messaging session (block 724).

Although the procedure 700 and implementations 800, 900, 1000, 1100, 1200, 1300 of FIGS. 8-13 were described in relation to an instant messaging session performed using an online activity provider 102(m), similar functionality may be employed in a peer-to-peer network without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts and acts are disclosed as exemplary forms of implementing the claimed invention.

What is claimed is:

1. A method comprising:
   during a launch of an online activity, wherein the online activity is an online game that communicates with one or more instant messaging modules via an application programming interface to initiate an instant messaging session:
      a client specifying a plurality of other clients that may participate in the online activity over a network by examining a persistent object, wherein:
         the persistent object is created by the client via a create group function and comprises naming a group and references to other clients in the group;
         the persistent object automatically causes notifications to be configured for the other clients referenced by the persistent object; and
         the persistent object is callable by the client and each of the plurality of other clients; and
      the client initiating the instant messaging session, during which, an instant message is formed for communication to each of the plurality of other clients over the network to invite participation in the online activity;
   managing presence of the plurality of other clients and the client initiating online activity via one or more instant messaging modules, wherein managing a change in presence comprises:
      in an event one or more clients of the plurality of other clients responds to an invitation to participate in the online activity, adding the one or more clients of the plurality of other clients as a participant, to participate in the online activity;
      in an event one or more clients of the plurality of other clients that has been participating in the online activity ceases participation in the online activity, removing the one or more of the plurality of other clients from participating in the online activity, and saving a current state of interaction of the plurality of other clients and the client initiating the online activity in response to the ceasing;
      in an event the client initiating the online activity ceases participation in the online activity, removing the client initiating the online activity from participating in the online activity, and saving a current state of interaction of the plurality of other clients and the client initiating the online activity in response to the ceasing;
      in an event one or more clients of the plurality of other clients that has been removed from participating in the online activity rejoins the online activity after an arbitrary period of time, adding the one or more clients of the plurality of other clients to participate in the online activity from a stored state of interaction of the plurality of other clients and the client initiating the online activity; and
      in an event the client initiating the online activity that has been removed from participating in the online activity rejoins the online activity after an arbitrary period of time, adding the client initiating the online activity to participate in the online activity from a stored state of interaction of the plurality of other clients and the client initiating the online activity.

2. A method as described in claim 1, wherein the references to other clients in the group comprise network addresses for the other clients.

3. A method as described in claim 1, wherein each of the plurality of other clients is permitted to include a reference of another client to increase membership of a group described by the persistent object.

4. A method as described in claim 1, wherein the specifying is performed before the initiating.

5. A method as described in claim 1, wherein the instant message is configured to:
   accept an indication that a respective client of the plurality of other clients desires participation in the online activity; and
   cause the indication to be communicated to a host of the online activity.

6. A method as described in claim 1, wherein the network includes a peer-to-peer network.

7. A method as described in claim 1, further comprising storing a state of interaction of the plurality of clients with the online activity in response to a change in presence.

8. A method as described in claim 1, wherein adding the one or more clients of the plurality of other clients to participate in the online activity from the stored state of interaction of the plurality of other clients and the client initiating the online activity comprises notifying the one or more clients being added to the online activity of acts performed by other clients participating in the online activity before the one or more clients was added to the online activity.

9. A method comprising:
   during launch of an online activity by an initiating client, wherein the online activity is an online game that communicates with one or more instant messaging modules via an application programming interface to initiate an instant messaging session;

the initiating client specifying a plurality of other clients that may participate in the online activity over a network, wherein the specifying is performed by examining a persistent object, wherein the persistent object automatically causes notifications to be configured for other clients referenced by the persistent object, and the persistent object is callable by the initiating client and each of the plurality of other clients, the persistent object comprising a named group and network addresses for the other clients; and broadcasting an instant message by the initiating client to each of a plurality of other clients specified for participation in the online activity;

launching the online activity for the initiating client before receipt of a response from at least one of the plurality of other clients;

saving a current state of interaction of the plurality of other clients and the initiating client in response to a change in presence of the plurality of other clients and the initiating client;

in an event one or more clients of the plurality of other clients has been removed from participating in the online activity, and then rejoins the online activity after an arbitrary period of time, adding the one or more clients of the plurality of other clients to participate in the online activity from a stored state of interaction of the plurality of other clients and the client initiating the online activity; and in an event the client initiating the online activity has been removed from participating in the online activity, and then rejoins the online activity after an arbitrary period of time, adding the client initiating the online activity to participate in the online activity from a stored state of interaction of the plurality of other clients and the client initiating the online activity.

10. A method as described in claim 9, wherein the online activity is accessed through execution of a respective online activity module by each said client.

11. A method as described in claim 10, wherein each said online activity module is executable to communicate over a network with an online activity provider that hosts the online activity.

12. A method as described in claim 9, further comprising launching the online activity for the at least one of the plurality of other clients after the launching of the online activity for the initiating client.

13. A method as described in claim 9, monitoring presence of each of the plurality of other clients in relation to the online activity by a module that is executable to perform the broadcasting but is not executable to provide the online activity.

14. A method as described in claim 9, wherein adding the one or more clients of the plurality of other clients to participate in the online activity from the stored state of interaction of the plurality of other clients and the initiating client comprises notifying the one or more clients being added to the online activity of acts performed by other clients participating in the online activity before the one or more clients was added to the online activity.

15. One or more computer readable media comprising one or more computer executable modules that, when executed on a computer, configure the computer to perform operations comprising:

exposing, via an application programming interface, an indication of presence of one or more clients in relation to an online activity, wherein the online activity is an online game that communicates with one or more instant messaging modules via the application programming interface to initiate an instant messaging session; and starting a new session of the online activity by an initiating client;

the initiating client specifying a plurality of other clients that may participate in the online activity over a network, wherein the specifying is performed by creating a persistent object comprising a named group and network addresses for the other clients, wherein the persistent object automatically causes notifications to be configured for the other clients referenced by the persistent object, and the persistent object is callable by the initiating client and each of the plurality of other clients;

communicating at least one instant message to each of the plurality of other clients specified for participation in the online activity, wherein the participation in the online activity comprises:

continuing a stored session of the online activity from a previously stored state of interaction of the plurality of other clients and the initiating client such that;

in an event one or more clients of the plurality of other clients has been removed from participating in the online activity, and then rejoins the online activity, adding the one or more clients of the plurality of other clients to participate in the online activity from a stored state of interaction of the plurality of other clients and the client initiating the online activity; and in an event the client initiating the online activity has been removed from participating in the online activity, and then rejoins the online activity, adding the client initiating the online activity to participate in the online activity from a stored state of interaction of the plurality of other clients and the client initiating the online activity.

16. One or more computer readable media as described in claim 15, wherein the application programming interface is further configured to accept an input which indicates an originator of data received via the application programming interface.

17. One or more computer readable media as described in claim 15, wherein the application programming interface is further configured to accept a plurality of references to the plurality of clients for communication of the instant messages.

18. One or more computer readable media as described in claim 15, wherein the indication is exposed to at least one module that is executable to enable participation with the online activity over a network.

19. One or more computer readable media as described in claim 15, wherein the online activity is hosted by an online activity provider that is accessible over a network.

20. One or more computer readable media as described in claim 15, wherein adding the one or more clients to participate in the online activity from the stored state of interaction of the plurality of other clients and the initiating client comprises notifying the one or more clients being added to the online activity of acts performed by other clients participating in the online activity before the one or more clients was added to the online activity.

* * * * *